US012617693B2

(12) United States Patent
Oyediran et al.

(10) Patent No.: US 12,617,693 B2
(45) Date of Patent: May 5, 2026

(54) HIGH PRESSURE CAUSTIC LEACH METHODS AND PROCESSES FOR RECOVERY OF SCANDIUM AND RARE-EARTH OXIDES

(71) Applicant: IMPERIAL MINING GROUP LIMITED, Montreal (CA)

(72) Inventors: Yemi Oyediran, Mississauga (CA); Daniel Rische, Freudenberg (DE); Christian Graf, Amberg (DE)

(73) Assignee: SCANDIUM CANADA LTD., Montreal (CA)

( * ) Notice: Subject to any disclaimer, the term of this patent is extended or adjusted under 35 U.S.C. 154(b) by 703 days.

(21) Appl. No.: 18/062,318

(22) Filed: Dec. 6, 2022

(65) Prior Publication Data

US 2023/0192506 A1     Jun. 22, 2023

Related U.S. Application Data

(60) Provisional application No. 63/265,176, filed on Dec. 9, 2021.

(51) Int. Cl.
C01F 17/247 (2020.01)
C01F 17/13 (2020.01)
(Continued)

(52) U.S. Cl.
CPC ............ C01F 17/247 (2020.01); C01F 17/13 (2020.01); C01F 17/20 (2020.01); C01F 17/212 (2020.01);
(Continued)

(58) Field of Classification Search
None
See application file for complete search history.

(56) References Cited

U.S. PATENT DOCUMENTS

| | | |
|---|---|---|
| 8,982,325 B2 | 3/2015 | Totzeck et al. |
| 9,399,804 B2 | 7/2016 | Ozaki et al. |
| 2012/0207656 A1 | 8/2012 | Duyvesteyn et al. |

FOREIGN PATENT DOCUMENTS

CN         103225023 A  *  7/2013

OTHER PUBLICATIONS

Gupta et al., Extractive Metallurgy of Rare Earths, CRC Press LLC, 2004 (Gupta) (Year: 2004).*

(Continued)

*Primary Examiner* — Keling Zhang
(74) *Attorney, Agent, or Firm* — FASKEN MARTINEAU DUMOULIN, LLP; Kimberly A. Peaslee

(57)     ABSTRACT

Despite the abundance of scandium, its commercial applications continue to be limited by the absence of reliable, secure, stable and long-term production. The subject-matter disclosed herein provides for a method for extracting Rare Earth Elements (REE), scandium and/or Rare-Earth Oxides (REO) from ore and mineral concentrates, the method comprising: providing Rare Earth Elements (REE) and/or scandium bearing feedstock; a high-pressure caustic (HPC) leaching step, comprising leaching the feedstock in an alkali solution at a first temperature for a target period of time and at a given pressure to produce a leachate slurry; extracting a solid residue from the leachate slurry; leaching of the solid residue in a mineral acid to form a primary leach solution; extracting scandium and/or REE from the primary leach solution; and/or precipitating REE remaining in the raffinate to form a mixed REE-carbonate to thereby facilitate the extraction of REO.

17 Claims, 3 Drawing Sheets

(51) Int. Cl.
*C01F 17/20* (2020.01)
*C01F 17/212* (2020.01)
*C22B 3/10* (2006.01)
*C22B 3/12* (2006.01)
*C22B 3/22* (2006.01)
*C22B 59/00* (2006.01)

(52) U.S. Cl.
CPC .................. *C22B 3/10* (2013.01); *C22B 3/12*
(2013.01); *C22B 3/22* (2013.01); *C22B 59/00*
(2013.01)

(56) References Cited

OTHER PUBLICATIONS

Balachandran, Extraction of rare earths for advanced applications, Treatise on Process Metallurgy, 2014 (Balachandran) (Year: 2014).*
Gudyanga, Minerals in Africa, 2020 (Gudyanga) (Year: 2020).*
Huang et al., Influence of microwave heating on the extractions of fluorine and rare earth elements from mixed rare earth concentrate, Hydrometallurgy, 2016 (Huang) (Year: 2016).*
Machine translation of Huang et al., CN 103225023A (Year: 2013).*

* cited by examiner

HIGH PRESSURE CAUSTIC LEACH METHODS AND PROCESSES FOR RECOVERY OF SCANDIUM AND RARE-EARTH OXIDES

CROSS-REFERENCE

This application claims priority to U.S. Provisional Application No. 63/265,176 filed on Dec. 9, 2021 ("HIGH PRESSURE CAUSTIC LEACH METHODS AND PROCESSES FOR RECOVERY OF SCANDIUM AND RARE-EARTH OXIDES"), which is entirely incorporated herein by reference.

FIELD

The invention relates to methods and processes for producing and recovering rare earth elements (REE), and more particularly to systems and methods for extracting and recovering scandium, and separated rare-earth oxides (REO) from ore and mineral concentrates that contain scandium such as in the form of silicates.

BACKGROUND

Rare Earth Elements (REE) are a set of seventeen metallic elements, including the fifteen (15) lanthanoids ranging in atomic number from 57 to 71 on the periodic table. They further include scandium having atomic number 21 and yttrium having atomic number 39.

Given their unusual physical and chemical properties such as magnetic and optical properties, REE are necessary components of more than 200 products across a wide range of applications, especially in high-tech consumer products such as cellular telephones, computer hard drives, electric and hybrid vehicles, flat-screen monitors and televisions and defense applications such as electronic displays, guidance systems, lasers, and radar and sonar systems.

In the United States, the principal uses for scandium in 2020 were in aluminum-scandium alloys and solid oxide fuel cells (SOFCs). Other uses for scandium included ceramics, electronics, lasers, lighting, and radioactive isotopes. However, commercial applications of scandium continue to be limited by the absence of reliable, secure, stable, long-term production of the metal.

Scandium and yttrium are metals associated with REE because their chemical and physical similarities to lanthanoids. Scandium is known for not occurring in economic concentrations or in the same geological settings as the lanthanoids and yttrium.

Scandium lacks affinity for common ore-forming anions; therefore, it is widely dispersed in the lithosphere and forms solid solutions with low concentrations in more than 100 minerals. As a result, Scandium remains only sparsely available and accordingly, even in applications where the use of scandium would be advantageous, industry has been forced to turn to more readily available alternatives. For example, the use of scandium-aluminum alloys in aerospace applications is advantageous because of the lower specific gravity of scandium-aluminum alloys versus the more widely used titanium aluminum alloys. In a commercial airline fleet, this difference in specific gravity may also translate into substantial fuel savings in the course of a year. Moreover, scandium-aluminum alloys are comparable in strength to titanium-aluminum alloys and are actually less expensive to produce on a cost of raw materials basis.

However, despite these advantages, the use of scandium-aluminum alloys in this application has been thwarted by the low availability of scandium.

Despite being difficult to refine, scandium is abundant in the earth's crust. Indeed, scandium is a 50th most common element on earth, and is comparable in abundance to cobalt. However, as explained above, scandium is distributed sparsely, and occurs only in trace amounts in many scandium-bearing ores. Thortveitite and kolbeckite are the primary mineral sources of scandium, and thortveitite, euxenite, and gadolinite are the only known concentrated mineral sources of this element. Thortveitite can contain up to 45% of scandium (in the form of scandium (III) oxide), though the mineral is somewhat rare. Hard-rock type ferrosyenite mineralization containing ferromagnesian minerals including scandium-bearing silicates such as pyroxenes and amphiboles are also a good source of Scandium and REEs.

REEs do not occur naturally as metallic elements, but given their strong affinity for oxygen, this causes them to form mostly as their respective oxides (REOs). Because of their reactivity, it is difficult to refine the rare earths to a pure form. Due to their chemical similarity, it is even more difficult to separate them into individual elements or compounds.

Rare Earth Oxides (REO) minerals occur in a variety of geological environments. In general, they are found in hard rock deposits or in placer sands and are of primary or secondary origin, respectively. Composition of the REO minerals is strongly influenced by the presence of carbonates and phosphates.

Some processes and methods for the recovery of scandium are known in the art. Historically, scandium has been produced as byproduct material in China (iron ore, rare earths, titanium, and zirconium), Canada (titanium), Kazakhstan (uranium), the Philippines (nickel), Russia (apatite and uranium), and Ukraine (uranium).

In the United States, scandium is preferentially neither mined, nor recovered from process streams or mine tailings. Scandium is produced primarily from the scandium-yttrium silicate mineral thortveitite and from byproduct leach solutions from uranium operations. Scandium may also be recovered as a by-product from bauxite residue, titanium, zirconium, cobalt, and nickel process streams.

Thus, some processes and methods for extracting scandium from feedstocks are known. For example, US Patent Application 2012/0207656 provides for an "acid bake" method for extracting scandium values from scandium-containing ores. The method comprises (a) providing an ore which contains scandium; (b) treating the ore with an acid; (c) baking the ore; (d) leaching scandium from the baked ore, (e) and recycling the gaseous effluents to reconstitute the acid used in leaching. Another related method comprises (a) providing an ore which contains scandium; (b) treating the ore with an acid; (c) baking the ore, thus generating gaseous effluents; (d) recycling the gaseous effluents to reconstitute the acid; and (e) using the reconstituted acid in a second iteration of the method. However, acid bake processes have not been very effective in recovering scandium from pyroxene and amphibole group scandium-bearing minerals such as hedenbergite and ferrohornblende because the acid treatment at high temperature (250° C.-300° C.) has proven to be ineffective in liberating scandium from the silicate matrix of these minerals, resulting in very low recovery rate.

Applications of pressure leaching are known in the art in the processing of aluminum. The Bayer process, invented in 1887, is used for producing pure alumina ($AL_2O_3$), wherein aluminum bearing bauxite ores convert to sodium aluminate ($NaALO_2$) in the presence of caustic (NaOH). Such reaction, depending on the bauxite mineralogy, is performed at temperatures of 143° C. and pressures of about 4.20 Atm, and required the use of pressure vessels, also known as digesters. There is no known art for the use of caustic (NaOH) for extracting and recovering scandium from ore and mineral concentrates that contain scandium-bearing silicates.

High Pressure Acid Leach (HPAL) has also been used to recover Scandium contained in nickel oxide ores. For example, U.S. Pat. No. 9,399,804 provides a method for recovering scandium comprising the leaching step of obtaining a leachate and leach residue by solid-liquid separation under high temperature and high pressure after charging a nickel oxide ore containing scandium, aluminum and chromium into a pressure vessel with sulfuric acid, the neutralization step of obtaining a neutralized sediment and a post-neutralization solution by adding a neutralizer to the leachate, the sulfuration step of, by adding a sulfidizing agent to the post-neutralization solution, separating the liquid into nickel sulfide and a post-sulfuration solution, the ion exchange step of obtaining a scandium eluent by bringing the post-sulfuration solution into contact with a chelate resin to adsorb the scandium on the chelate resin, the solvent extraction step of obtaining a stripping solution by bringing the scandium eluent into contact with an extraction agent, the scandium precipitation step of obtaining precipitates by adding a neutralizer or oxalic acid to the stripping solution, and the roasting step of obtaining scandium oxide by drying and roasting the precipitates. However, this process requires oxide nickel as a starting material for extracting Scandium, and it is not optimal for extracting and recovering Scandium from ore and mineral concentrates that contain scandium-bearing silicates. Although this method has been proven effective for processing lateritic ores for the recovery of nickel, cobalt and associated scandium as a by-product, the HPAL method for recovering Scandium from hard-rock type mineralization containing Scandium-bearing pyroxenes and amphiboles has not been shown to be effective.

Other methods for recovering scandium from ores are also known. For example, U.S. Pat. No. 9,982,325 provides a method for recovering scandium values from scandium-bearing ores. The method comprises (a) providing a scandium-bearing ore; (b) subjecting the scandium-bearing ore to atmospheric pressure acid leaching with sulfuric acid, thereby producing a first, scandium bearing solution containing ferric ($Fe^{3+}$) ions; (c) subjecting the first solution to hydrothermal processing, thereby precipitating hematite or a basic iron sulfate from the first solution and generating a second, scandium-bearing solution; and (d) recovering scandium values from the second solution.

To this date, there is no known method or process that efficiently recover Scandium and/or REEs from hard-rock type scandium-bearing silicates such as pyroxenes and amphiboles. There is no known method or process capable of efficiently liberating Scandium from the silicate matrix in the minerals. There is therefore a need in the industry to provide a method that seeks to recover scandium from ore and mineral concentrates that contain scandium-bearing silicates more adequately than prior methods and processes and that seeks to alleviate at least some of the deficiencies associated with prior methods.

SUMMARY

As embodied and broadly described herein, according to a broad aspect, there is provided a method and process for the recovery of scandium (Sc) from ore and mineral concentrates that contain scandium-bearing silicates, that may also contain fluorides in the crystal lattice, and rare earth elements-bearing phosphates, silicates and carbonates.

According to a broad aspect, there is provided a method of extracting Rare Earth Elements (REE) or scandium from ore, REE and/or scandium bearing feedstock and/or scandium/REE bearing mineral concentrate, the method comprising: providing the ore, the REE and/or scandium bearing feedstock and/or scandium/REE bearing mineral concentrate; leaching the ore, the REE and/or scandium bearing feedstock and/or the scandium/REE bearing mineral concentrate in an alkali solution at a first temperature for a target duration and at a given pressure to produce a leachate slurry; extracting a solid residue from the leachate slurry; leaching of the solid residue in a mineral acid to form a primary leach solution; and extracting REE and/or scandium from the primary leach solution.

The scandium/REE bearing mineral concentrate may be produced from ore using one of or a combination of known mineral processing techniques, including flotation, magnetic separation, gravity separation, and/or sensor-based ore sorting.

The leaching of scandium/REE bearing mineral concentrate and/or Rare Earth Elements (REE) and/or Scandium bearing feedstock in an alkali solution may comprise a solid content of 10 to 45 wt %.

The first temperature may be between 180° C. and 280° C.

The first temperature may preferably be about 250° C.

The target period of time of the caustic leaching may be between about 60 and 180 minutes.

High Pressure Caustic leach (HPC leach in alkali solution) means that the caustic leach is performed in a pressurize environment or vessel at a pressure above atmospheric pressure. Advantageously, the HPC leach may be performed at a pressure between 1000 kPa (9.87 Atm) and 4000 kPa (39.48 Atm).

The high-pressure caustic leaching step may be performed in a reaction vessel or in an autoclave.

The alkali solution may comprise an alkali reagent selected from the group consisting of sodium hydroxide, sodium carbonate, lime, magnesium hydroxide, potassium hydroxide and potassium carbonate at a dosage of 500 to 2000 g per kg of Rare Earth Elements (REE) and/or Scandium bearing feedstock.

In another embodiment, the method for extracting Rare Earth Elements (REE) and/or Scandium from ore and mineral concentrates from Rare Earth Elements (REE) and/or Scandium bearing feedstock may further comprise:

destroying the silicate matrix of the Sc-bearing silicate minerals by forming water soluble sodium silicate, thus liberating Scandium for recovery in the following acid leach step transforming fluorides and phosphates to water soluble compounds; and removing fluorides and phosphates from the slurry.

The Scandium and REEs may further be transformed to insoluble hydroxides, thereby remaining in the solid residue.

The extracting of the solid residue from the leachate may be performed by completing solid/liquid separation in a thickener or filtration in a vacuum or pressure filter, or a combination of thickener and filtration equipment.

The solid residue may be washed with water to remove the residual water-soluble silicates, fluorides, and phosphates.

The Sc/REE-bearing solid residue is leached using a mineral acid to dissolve the scandium and REE into a primary leach solution.

The mineral acid may be selected from the group consisting of Hydrochloric acid (HCl), Sulphuric acid ($H_2SO_4$), Nitric acid ($HNO_3$), Hydrobromic acid (HBr), Perchloric acid ($HClO_4$), and Hydroiodic acid (HI).

The mineral acid may be at a concentration of 5 to 20 wt.-%.

The leaching of the solid residue in the mineral acid may be performed at a temperature between 20° C. to 30° C. for a period of 15 to 1200 minutes, preferably 60 to 1200 minutes.

The leaching of the solid residue in the mineral acid may be preferably be performed while stirring at ambient pressure 1 ATM.

Scandium and/or REE may be extracted from the primary leach solution by precipitation, solvent extraction, ion exchange extraction, and/or a combination of these hydrometallurgical extraction techniques.

According to another broad aspect, there is provided a method for extracting rare-earth oxides (REO) from ore, REE and/or scandium bearing feedstock and/or scandium/REE bearing mineral concentrate, the method comprising: providing the ore, REE and/or scandium bearing feedstock and/or scandium/REE bearing mineral concentrate; leaching the ore, REE and/or scandium bearing feedstock and/or scandium/REE bearing mineral concentrate in an alkali solution at a first temperature for a target duration and at a given pressure to produce a leachate slurry, wherein the leaching in the alkali solution is a High Pressure Caustic (HPC) leaching; extracting a solid residue from the leachate slurry; leaching of the solid residue in a mineral acid to form a primary leach solution, from which scandium is extracted to thereby produce a raffinate solution; precipitating the REE remaining in the raffinate solution to form a mixed REE-carbonate; and extracting the separated REO products from the mixed REE-carbonate.

According to another broad aspect, there is provided a process for producing Rare Earth Elements (REE) and/or scandium from ore, REE and/or scandium bearing feedstock and/or scandium/REE bearing mineral concentrate, the process comprising: providing the ore, the REE and/or scandium bearing feedstock and/or scandium/REE bearing mineral concentrate; leaching the ore, the REE and/or scandium bearing feedstock and/or the scandium/REE bearing mineral concentrate in an alkali solution at a first temperature for a target duration and at a given pressure to produce a leachate slurry; extracting a solid residue from the leachate slurry; leaching of the solid residue in a mineral acid to form a primary leach solution; and extracting REE and/or scandium from the primary leach solution.

According to another broad aspect, there is provided a process for producing rare-earth oxides (REO) from ore, REE and/or scandium bearing feedstock and/or scandium/REE bearing mineral concentrate, the process comprising: providing the ore, REE and/or scandium bearing feedstock and/or scandium/REE bearing mineral concentrate; leaching the ore, REE and/or scandium bearing feedstock and/or scandium/REE bearing mineral concentrate in an alkali solution at a first temperature for a target duration and at a given pressure to produce a leachate slurry, wherein the leaching in the alkali solution is a High Pressure Caustic (HPC) leaching; extracting a solid residue from the leachate slurry; leaching of the solid residue in a mineral acid to form a primary leach solution, from which scandium is extracted to thereby produce a raffinate solution; precipitating the REE remaining in the raffinate solution to form a mixed REE-carbonate; and extracting the REO from the mixed REE-carbonate.

The term ore is intended to mean mineralized rock or sands that contain an economic quantity of minerals of primary or secondary value. Ore in the context of this application may also be hard-rock type scandium-bearing silicates such as pyroxenes and amphiboles.

The term run of Mine (ROM) means the raw unprocessed or uncrushed ore material at its natural state obtained after mining.

The term rare-earth metals (REE) is intended to mean any one of, or all of, the following: Cerium (Ce), Dysprosium (Dy), Erbium (Er), Europium (Eu), Gadolinium (Gd), Holmium (Ho), Lanthanum (La), Lutetium (Lu), Neodymium (Nd), Praseodymium (Pr), Promethium (Pm), Samarium (Sm), Scandium (Sc), Terbium (Tb), Thulium (Tm), Ytterbium (Yb), Yttrium (Y), and any other metals that share the unusual physical and chemical properties of REEs.

The term rare-earth oxides (REO) is intended to mean any one of, or all of, the following: Cerium (IV) Oxide, Cerium Dioxide ($CeO_2$), Cerium (III) Oxide ($Ce_2O_3$), Dysprosium Oxide ($Dy_2O_3$), Erbium (III) Oxide ($Er_2O_3$), Europium (III) Oxide ($Eu_2O_3$), Gadolinium (III) Oxide ($Gd_2O_3$), Holmium (III) Oxide ($Ho_2O_3$), Lanthanum Oxide ($La_2O_3$), Lutetium (III) Oxide ($Lu_2O_3$), Neodymium (III) Oxide or Neodymium Sesquioxide ($Nd_2O_3$), Praseodymium (III,IV) Oxide ($Pr_6O_{11}$), Promethium (III) Oxide ($Pm_2O_3$), Samarium (III) Oxide ($Sm_2O_3$), Scandium Oxide ($Sc_2O_3$), Terbium (III,IV) Oxide or Tetraterbium Heptaoxide ($Tb_4O_7$) or ($TbO_{1.75}$), or any one of the other forms of Terbium Oxides, namely, $TbO_2$, $Tb_2O$ or $Tb_6O_{11}$, Thulium Oxide ($Tm_2O_3$), Ytterbium (III) Oxide ($Yb_2O_3$), Yttrium (III) Oxide ($Y_2O_3$), and any other oxides that share the unusual physical and chemical properties of REOs.

The term crude scandium cake is intended to mean a precipitated solid with 1% to 10% scandium concentration.

The term lime is intended to mean is a calcium-containing inorganic mineral composed primarily of oxides, and hydroxide, such as calcium oxide and/or calcium hydroxide.

Features and advantages of the subject-matter hereof will become more apparent in light of the following detailed description of selected embodiments, as illustrated in the accompanying figures. As will be realized, the subject-matter disclosed and claimed is capable of modifications in various respects, all without departing from the scope of the claims. Accordingly, the drawings and the description are to be regarded as illustrative in nature and not as restrictive and the full scope of the claimed subject-matter.

BRIEF DESCRIPTION OF THE DRAWINGS

Having thus generally described the nature of the invention, reference will now be made to the accompanying drawings, showing by way of illustration example embodiments thereof and in which.

DETAILED DESCRIPTION OF EMBODIMENTS

Variants, examples and preferred embodiments of the invention are described hereinbelow. When numerical figures or units are used herein, it is to be understood that minor variations, such as within 15%, remain within the description of embodiments as would be understood by a person of skill in the art. This remains the case even if the terms "about", "approximately" or "around" are used or not used in this description, figures or claims.

In an embodiment, there is disclosed a method of extracting Rare Earth Elements (REE) and/or scandium from ore, REE and/or scandium bearing feedstock and/or scandium/REE bearing mineral concentrate, the method comprising: providing the ore, the REE and/or scandium bearing feedstock and/or scandium/REE bearing mineral concentrate; leaching the ore, the REE and/or scandium bearing feedstock and/or the scandium/REE bearing mineral concentrate in an alkali solution at a first temperature for a target duration and at a given pressure to produce a leachate slurry; extracting a solid residue from the leachate slurry; leaching of the solid residue in a mineral acid to form a primary leach solution; and extracting REE and/or scandium from the primary leach solution.

Figure 1:
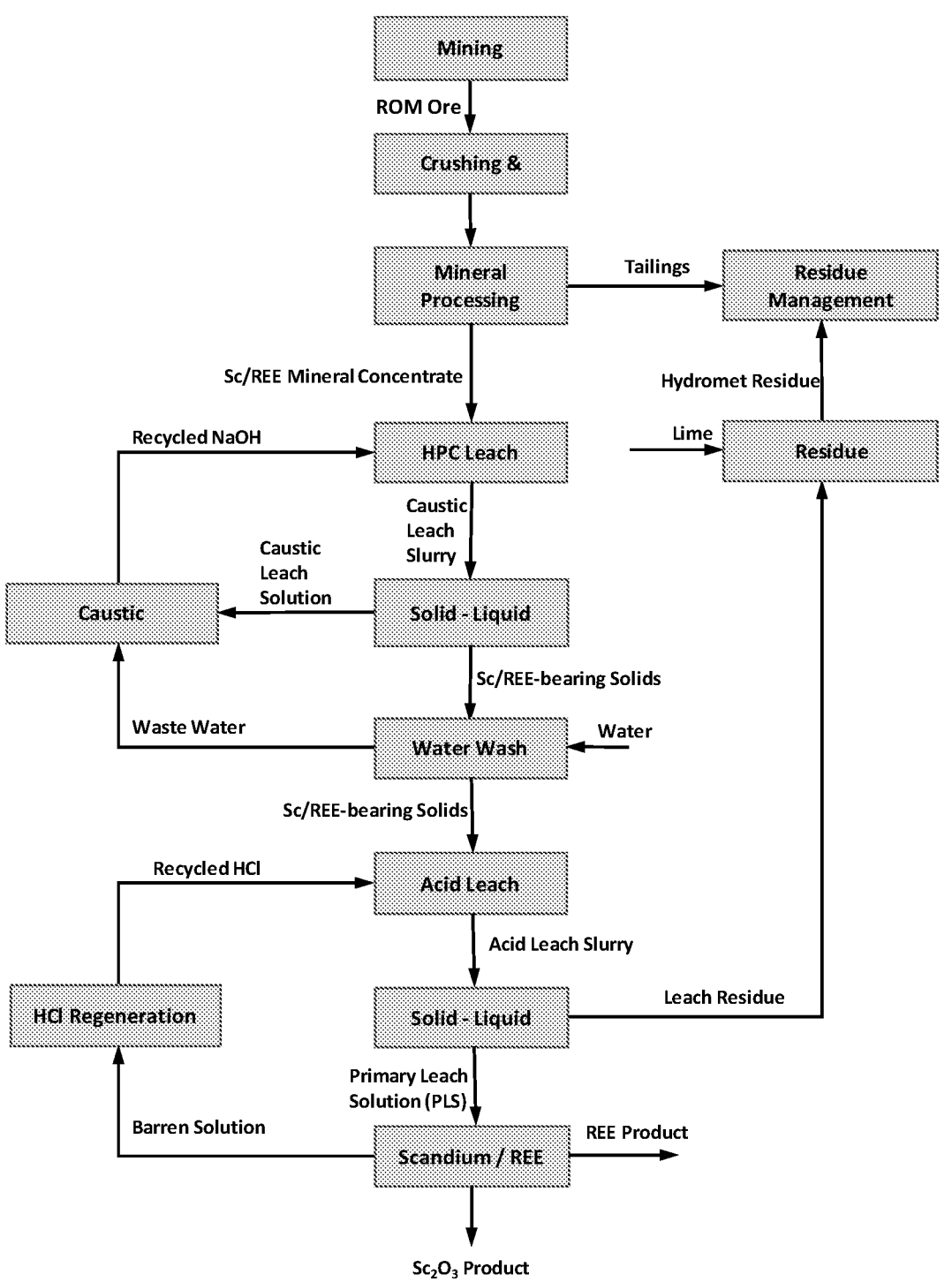
FIG. 1—represents a block diagram illustrating the method of recovering scandium according to one embodiment of the present invention.

Referring now to FIG. 1, a block diagram illustrates an embodiment of a method for extracting Mineral concentrates, Rare Earth Elements (REE) and/or Scandium from ore and/or REE and/or scandium bearing feedstock, the method comprising; providing the ore and/or the REE and/or scandium bearing feedstock; leaching the ore and/or the REE and/or scandium bearing feedstock in an alkali solution at a first temperature for a target duration and at a given pressure to produce a leachate slurry; extracting a solid residue from the leachate slurry; leaching of the solid residue in a mineral acid to form a primary leach solution; and extracting REE and/or scandium from the primary leach solution.

The alkali solution may comprise an alkali reagent selected from the group consisting of sodium hydroxide, sodium carbonate, potassium hydroxide and potassium carbonate.

The alkali solution may be provided at a dosage of 500 g per kg to 2000 g per kg of REE and/or scandium bearing feedstock.

The leachate slurry may be a caustic leach slurry.

The method may comprise regenerating and recycling the alkali reagent.

The leachate slurry may be cooled down to a second temperature of about 80° C.

The solid residue may be washed with water.

The REE and/or scandium bearing feedstock may comprise a solid content of to 45 wt-%.

The first temperature may be between 180° C. and 280° C.

The target duration of the caustic leaching may be between about 60 minutes and 180 minutes.

The given pressure may be between 9.87 ATM and 39.48 ATM.

The leaching in the alkali solution may be a High Pressure Caustic (HPC) leaching.

The HPC leaching may be performed in a reaction vessel or in an autoclave.

The method may comprise destroying the silicate matrix of the Sc-bearing silicate minerals by forming water soluble sodium silicate thereby liberating Scandium and/or REEs.

The method may comprise transforming fluorides and phosphates to water soluble compounds and removing fluorides and phosphates from the leachate slurry.

The fluorides and fluoride containing minerals may be removed prior to leaching of the solid residue in the mineral acid.

The mineral acid may be selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof.

The mineral acid may be at a concentration of 5 to 20 wt-%.

The leaching of the solid residue may comprise stirring for about 60 minutes.

The leaching of the solid residue may be performed at a second temperature between 20° C. and 30° C. for a period of 15 to 1200 minutes, preferably 60 to 1200 minutes.

The leaching of the solid residue may be performed at 1 ATM.

The leaching of the solid residue may be performed while stirring.

The REE and/or the scandium may be extracted from the primary leach solution by precipitation, solvent extraction or ion exchange extraction, or a combination thereof.

The method may comprise, wherein, between leaching of the solid residue and extracting REE and/or scandium from the primary leach solution, the method comprises the regenerating and recycling the mineral acid.

A raffinate solution may be generated after extracting the REE and/or scandium from the primary leach solution.

The HPC leaching may comprise transforming the REE and/or scandium to insoluble hydroxides.

The insoluble hydroxides may be present in the leachate slurry.

The separation of the solid residue from the leachate slurry may be conducted in a thickener, and/or vacuum or pressure filter.

The method may further comprise adding a suitable reducing agent, e.g., metallic iron powder to reduce ferric iron ($Fe^{3+}$) to ferrous iron ($Fe^{2+}$), between leaching of the solid residue and extracting REE and/or scandium from the primary leach solution.

After adding the metallic iron powder, the method may further comprise adding a neutralizing agent such as sodium hydroxide (NaOH), lime or magnesium oxide (MgO) to adjust the pH of the primary leach solution to about pH 3.5 to thereby form a crude scandium cake precipitate.

The crude scandium cake precipitate may be re-leached in a mineral acid selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof to form a scandium-rich releach solution.

The crude scandium cake precipitate is re-leached in hydrochloric acid to form a scandium-rich releach solution.

The scandium-rich releach solution may be purified with, precipitation, solvent extraction or ion exchange, or a combination thereof, to thereby extract scandium oxide product having a purity of 95% to 99.9% and producing a scandium-depleted solution.

The scandium oxide product may have a purity of 99.9%.

In another embodiment, there is further disclosed a method for extracting rare-earth oxides (REO) from ore, REE and/or scandium bearing feedstock and/or scandium/REE bearing mineral concentrate, the method comprising: providing the ore, REE and/or scandium bearing feedstock and/or scandium/REE bearing mineral concentrate; leaching the ore, REE and/or scandium bearing feedstock and/or scandium/REE bearing mineral concentrate in an alkali solution at a first temperature for a target duration and at a given pressure to produce a leachate slurry, wherein the leaching in the alkali solution is a High Pressure Caustic (HPC) leaching; extracting a solid residue from the leachate slurry; leaching of the solid residue in a mineral acid to form a primary leach solution, from which scandium is extracted to thereby produce a raffinate solution; precipitating the REE remaining in the raffinate solution to form a mixed REE-carbonate; and extracting the REO from the mixed REE-carbonate.

Figure 2:
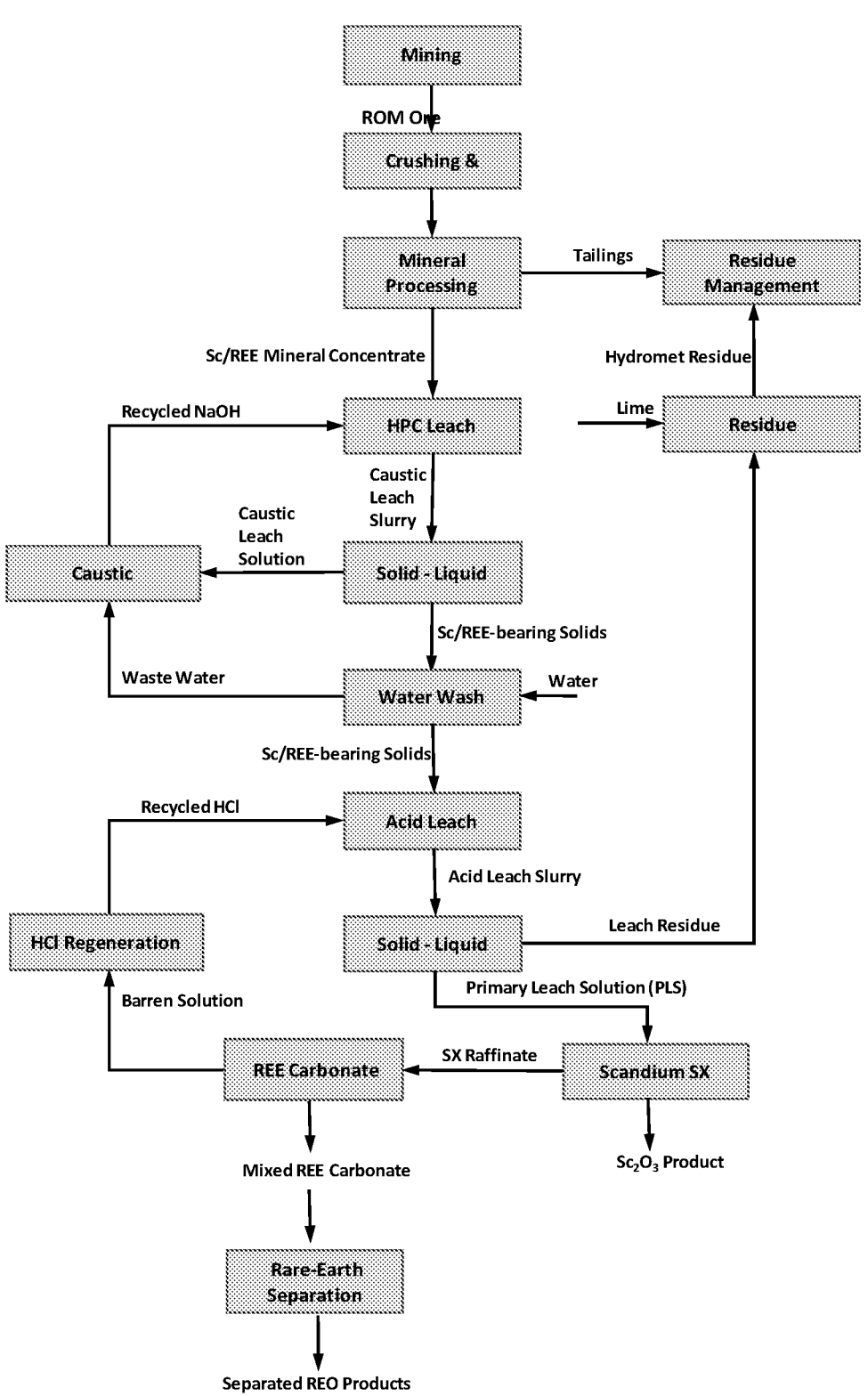
FIG. 2—represents a block diagram illustrating the method of recovering scandium according to one embodiment of the present invention, wherein rare earth elements (REE) that remain in the solvent extraction raffinate are precipitated with sodium carbonate to extract Rare-Earth Oxides (REO).

Referring now to FIG. 2, a block diagram illustrates an embodiment of a method for extracting rare-earth oxides (REO) from ore and/or REE and/or scandium bearing feedstock, the method comprising: providing the REE and/or scandium bearing feedstock; leaching the REE and/or scandium bearing feedstock in an alkali solution at a first temperature for a target duration and at a given pressure to produce a leachate slurry, wherein the leaching in the alkali solution is a High Pressure Caustic (HPC) leaching; extracting a solid residue from the leachate slurry; leaching of the solid residue in a mineral acid to form a primary leach solution, from which scandium is extracted to thereby produce a raffinate solution; precipitating the REE remaining in the raffinate solution to form a mixed REE-carbonate; and extracting the REO from the mixed REE-carbonate.

The alkali solution may comprise an alkali reagent selected from the group consisting of sodium hydroxide, sodium carbonate, potassium hydroxide and potassium carbonate.

The alkali solution may be provided at a dosage of 500 g per kg to 2000 g per kg of REE and/or scandium bearing feedstock.

The first temperature may be between 180° C. and 280° C.

The first temperature may preferably be about 250° C.

The target duration of the caustic leaching may be between about 60 minutes and 180 minutes.

The given pressure is between 9.87 ATM and 39.48 ATM.

The method may comprise transforming fluorides and phosphates to water soluble compounds and removing fluorides and phosphates from the leachate slurry.

The fluorides and fluoride containing minerals may be removed prior to leaching of the solid residue in the mineral acid.

The mineral acid may be selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof.

The raffinate solution may be produced using solvent extraction.

The REE precipitation may be performed by using sodium carbonate. The mixed REE-carbonate may be further processed in a REE separation plant to obtain Rare-Earth Oxides (REO).

The method may further comprise adding a metallic iron powder to reduce ferric iron ($Fe^{3+}$) into ferrous iron ($Fe^{2+}$), between leaching of the solid residue and precipitating the REE remaining in the raffinate solution.

After adding the metallic iron powder, the method may further comprise adding a neutralizing agent such as magnesium oxide (MgO), sodium hydroxide (NaOH), lime, or a combination thereof, to adjust the pH of the primary leach solution to about pH 3.5 to thereby form a crude scandium cake precipitate.

The crude scandium cake precipitate may be re-leached in a mineral acid selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof to form a scandium-rich releach solution.

The crude scandium cake precipitate may be re-leached in hydrochloric acid to form a scandium-rich releach solution.

The scandium-rich releach solution may be purified with solvent extraction to thereby extract scandium oxide product having a purity of 95% to 99.9% and producing a scandium-depleted solution.

The scandium oxide product may preferably have a purity of 99.9%.

The scandium-depleted solution may be contacted with air oxidizing ferric iron ($Fe^{3+}$) into its ferrous iron ($Fe^{2+}$) forming a ferric precipitate and producing a scandium and iron depleted solution.

The mixed REE carbonate product may be precipitated by adding the magnesium carbonate ($MgCO_3$) and/or sodium carbonate ($Na_2CO_3$) to the scandium and iron depleted solution and/or to the raffinate solution raising the pH to about pH 5-6.

The mixed REE-carbonate may have a purity of 42 to 45% REE.

The REE and/or REO may be extracted from the mixed REE carbonate for further processing and purification.

In another embodiment, there is disclosed a process for producing Rare Earth Elements (REE) and/or scandium from ore and/or REE and/or scandium bearing feedstock, the method comprising: providing the ore and/or the REE and/or scandium bearing feedstock; leaching the ore and/or the REE and/or scandium bearing feedstock in an alkali solution at a first temperature for a target duration and at a given pressure to produce a leachate slurry, wherein the leaching in the alkali solution is a High Pressure Caustic (HPC) leaching; extracting a solid residue from the leachate slurry; leaching of the solid residue in a mineral acid to form a primary leach solution; and extracting REE and/or scandium from the primary leach solution.

In embodiments, there is further disclosed a process for producing Rare Earth Elements (REE) and/or Scandium from ore and/or REE and/or scandium bearing feedstock, the method comprising: providing the ore and/or the REE and/or scandium bearing feedstock; leaching the ore and/or the REE and/or scandium bearing feedstock in an alkali solution at a first temperature for a target duration and at a given pressure to produce a leachate slurry, wherein the leaching in the alkali solution is a High Pressure Caustic (HPC) leaching; extracting a solid residue from the leachate slurry; leaching of the solid residue in a mineral acid to form a primary leach solution; and extracting REE and/or Scandium from the primary leach solution, wherein the Scandium extracted may have a purity from 95% to 99.9%.

The Scandium extracted may have a purity of 99.9%.

The REE and/or scandium may be extracted from the primary leach solution by precipitation, solvent extraction (SX), and ion exchange (IX), or a combination thereof.

The alkali solution may comprise an alkali reagent selected from the group consisting of sodium hydroxide, sodium carbonate, potassium hydroxide, and potassium carbonate.

The alkali solution may be provided at a dosage of 500 g per kg to 2000 g per kg of REE and/or scandium bearing feedstock.

The first temperature may be between 180° C. and 280° C.

The first temperature may preferably be about 250° C.

The target duration of the caustic leaching may be between about 60 minutes and 180 minutes.

The given pressure may be above atmospheric pressure and preferably between 9.87 ATM and 39.48 ATM.

The process may comprise transforming fluorides and phosphates to water soluble compounds and removing fluorides and phosphates from the leachate slurry.

The fluorides and fluoride containing minerals may be removed prior to leaching of the solid residue in the mineral acid.

The mineral acid may be selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof.

The mineral acid may be Hydrochloric acid (HCl).

In another embodiment, there is further provided a process for producing Rare-Earth Oxides (REO) from ore and/or REE and/or scandium bearing feedstock, the method comprising: providing the REE and/or scandium bearing feedstock; leaching the REE and/or scandium bearing feedstock in an alkali solution at a first temperature for a target duration and at a given pressure to produce a leachate slurry, wherein the leaching in the alkali solution is a High Pressure Caustic (HPC) leaching; extracting a solid residue from the leachate slurry; leaching of the solid residue in a mineral acid to form a primary leach solution, from which scandium is extracted to thereby produce a raffinate solution; precipitating the REE remaining in the raffinate solution to form a mixed REE-carbonate; and extracting the REO from the mixed REE-carbonate, wherein the mixed REE-carbonate may have a purity of 42 to 45% REE.

The REO may be extracted from the mixed REE-carbonate by solvent extraction in a separation facility to produce separated REO.

The alkali solution may comprise an alkali reagent selected from the group consisting of sodium hydroxide, sodium carbonate, potassium hydroxide, and potassium carbonate.

The alkali solution is provided at a dosage of 500 g per kg to 2000 g per kg of REE and/or scandium bearing feedstock.

The first temperature may be between 180° C. and 280° C.

The first temperature may preferably be about 250° C.

The target duration of the caustic leaching may be between about 60 minutes and 180 minutes.

The given pressure may be between 9.87 ATM and 39.48 ATM.

The process may comprise transforming fluorides and phosphates to water soluble compounds and removing fluorides and phosphates from the leachate slurry.

The fluorides and fluoride containing minerals may be removed prior to leaching of the solid residue in the mineral acid.

The mineral acid may be selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof.

The mineral acid may be Hydrochloric acid (HCl).

Figure 3:
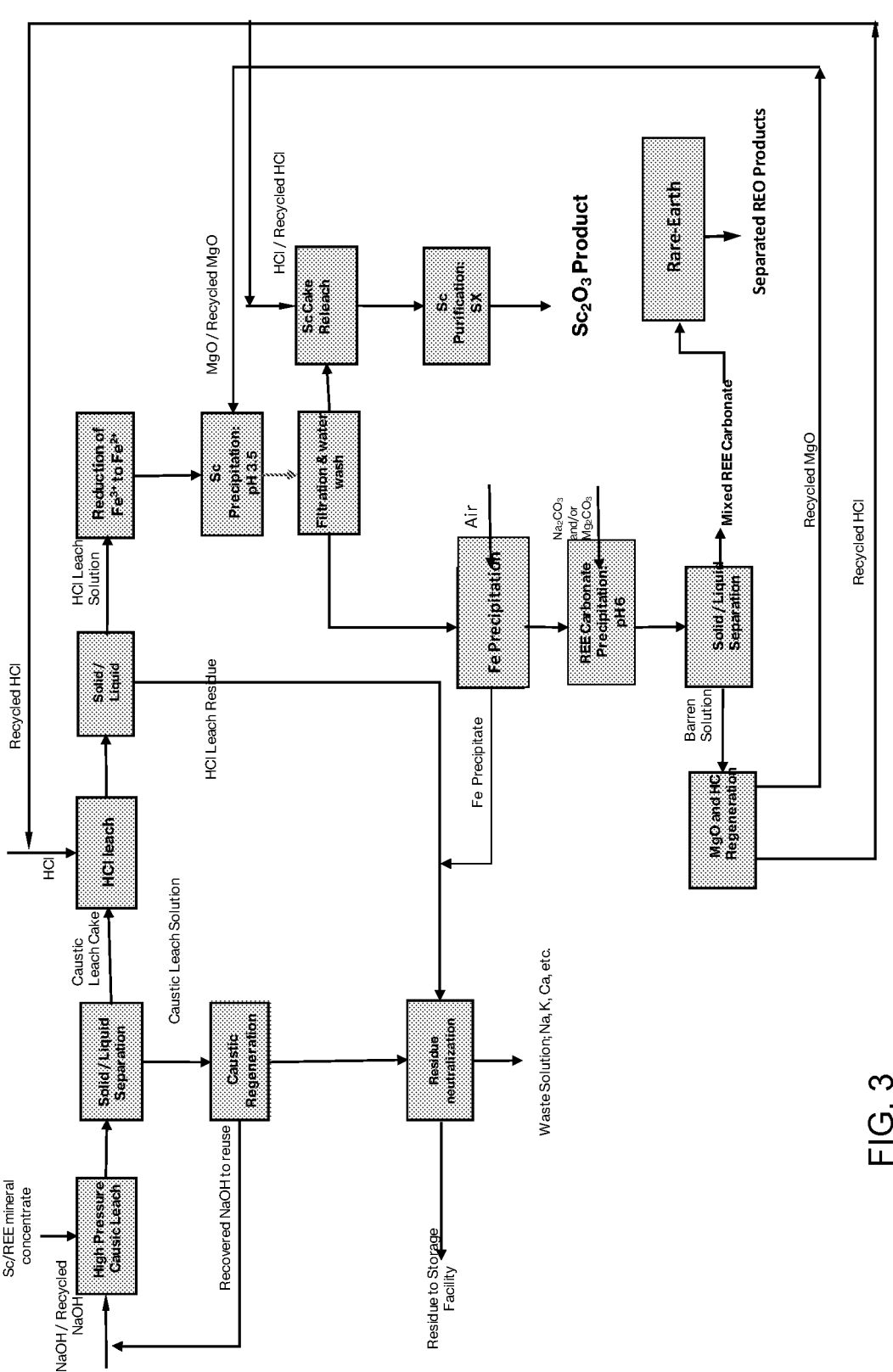
FIG. 3—represents a process flow diagram illustrating the method of recovering scandium and REE according to one embodiment of the present invention, wherein a crude scandium cake is produced followed from a first redox reaction of iron (from $Fe^{3+}$ to $Fe^{2+}$) and the precipitation of scandium by adding a neutralizing agent such as magnesium oxide (MgO), sodium hydroxide (NaOH), lime, or a combination thereof), and wherein mixed REE carbonate is produced for Scandium and/or REO extraction, followed from a second redox reaction of iron (from $Fe^{2+}$ to $Fe^{3+}$), and the precipitation of the remaining REE by the addition potassium carbonate ($K_2CO_3$), ammonium carbonate (($NH_4$)$_2CO_3$), magnesium carbonate ($MgCO_3$) and/or sodium carbonate ($Na_2CO_3$), or a combination thereof.

Referring now to FIG. 3, a block diagram illustrates an embodiment of a method for extracting scandium, rare-earth elements, and/or rare-earth oxides (REO) from ore and/or REE and/or scandium bearing feedstock, the method comprising: providing the REE and/or scandium bearing feedstock; leaching the REE and/or scandium bearing feedstock in an alkali solution at a first temperature for a target duration and at a given pressure to produce a leachate slurry, wherein the leaching in the alkali solution is a High Pressure Caustic (HPC) leaching; extracting a solid residue from the leachate slurry; leaching of the solid residue in a mineral acid to form a primary leach solution, wherein ferric iron ($Fe^{3+}$) is reduced to its ferrous state ($Fe^{2+}$) in the presence of the mineral acid and the scandium contained in the primary leach solution is precipitated with magnesium oxide (MgO) to form a crude scandium cake. The ferric iron ($Fe^{3+}$) is reduced to its ferrous state ($Fe^{2+}$) to prevent co-precipitation with scandium. The crude scandium cake is then re-leached in a mineral acid and high purity scandium is recovered from the scandium releach solution by solvent extraction.

Still referring to FIG. 3, there is provided a step wherein the ferrous iron ($Fe^{2+}$) is oxidized with air and precipitated in its ferric state ($Fe^{3+}$), forming a mixed REE carbonate by precipitating the REE remaining in the scandium and iron depleted solution with magnesium carbonate ($MgCO_3$) and/or sodium carbonate ($Na_2CO_3$), or a combination thereof; thereby allowing the extraction of REO from the mixed REE-carbonate.

The alkali solution may comprise an alkali reagent selected from the group consisting of sodium hydroxide, sodium carbonate, potassium hydroxide and potassium carbonate.

The alkali solution may be provided at a dosage of 500 g per kg to 2000 g per kg of REE and/or scandium bearing feedstock.

The first temperature may be between 180° C. and 280° C.

The first temperature may preferably be about 250° C.

The target duration of the caustic leaching may be between about 60 minutes and 180 minutes.

The given pressure is between 9.87 ATM and 39.48 ATM.

The method may comprise transforming fluorides and phosphates to water soluble compounds and removing fluorides and phosphates from the leachate slurry.

The fluorides and fluoride containing minerals may be removed prior to leaching of the solid residue in the mineral acid.

The mineral acid may be selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof.

The iron present in the primary leach solution as ferric iron ($Fe^{3+}$) may be reduced to its ferrous state ($Fe^{2+}$) by the addition of metallic iron powder, thereby avoiding co-precipitation with the scandium.

The scandium contained in the primary leach solution may be precipitated as a crude scandium cake by adjusting the solution pH to about 3.5 by adding a neutralizing agent such as magnesium oxide (MgO), sodium hydroxide (NaOH), lime, or a combination thereof.

A scandium depleted solution comprising iron in its ferrous state ($Fe^{2+}$) and having a pH of about pH 3.5 may be formed.

The precipitated crude scandium cake may be re-leached in a mineral acid selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof to form a scandium-rich releach solution.

The precipitated crude scandium cake may be re-leached preferentially in hydrochloric acid to form a scandium-rich releach solution.

The Scandium-rich releach solution may be purified further with precipitation, solvent extraction, ion exchange, or a combination thereof, to extract scandium oxide product having a purity of 95% to 99.9%.

The scandium oxide product may have a purity of 99.9%.

The ferrous iron ($Fe^{2+}$) in the scandium-depleted solution may be oxidized and precipitated in the form of ferric iron ($Fe^{3+}$) by re-oxidation with air, to thereby produce a scandium and iron depleted solution.

A mixed REE carbonate product may be precipitated from the scandium and iron depleted solution by raising the pH to about pH 5-6 with the addition of magnesium carbonate ($MgCO_3$), potassium carbonate ($K_2CO_3$), ammonium carbonate (($NH_4$)$_2CO_3$), and/or sodium carbonate ($Na_2CO_3$), or a combination thereof.

The mixed REE-carbonate may have a purity of 42 to 45% REE.

REE and/or REO may be extracted from the mixed REE carbonate for further processing and purification.

EXAMPLES

The chemical composition of mineral concentrates used in the tests is presented in Table 1. The test conditions for the high-pressure caustic leach (stage 1), and the mineral acid leach of the caustic residue (stage 2), and their metallurgical balances are provided in tables 2 and 3, respectively.

Testing High Pressure Caustic (HPC) Leaching—2

A scandium/REE mineral concentrate weighing 150 g (grade provided below in Table 1), produced from MET01 ore sample with magnetic separation was added to an autoclave together with 100 g of reagent liquor to target a pulp density of 60% solids by weight. The reagent liquor is made of 60 g of 100% sodium hydroxide (NaOH) dissolved in water at caustic addition rate of 0.4 ton NaOH per ton of mineral concentrate. The slurry consisting of mineral concentrate and NaOH solution was agitated in an autoclave while being heated to a target temperature of 250° C. The slurry was kept at the target temperature for a period of 120 minutes to allow the dissolution of silicate minerals. After 120 minutes, the slurry was cooled to about 80° C., and then filtered in a vacuum filter to separate the caustic leach solution from the Sc/REE containing-residue. The residue was thoroughly washed with water. The mass and volume of the leach liquor (including wash solution) were determined to be 1352.6 g, and 1320 ml respectively. The mass of the wet residue was measured, as well as its mass after drying. Aliquots of the leach liquor and dry residue were taken for chemical analysis. The metallurgical balance of the caustic dissolution (stage 1) for this test showed that 31.4% of Si was dissolved while only 2.8% Sc and 0.3% of REE deported to the caustic leach liquor. The test conditions, chemical analysis of the leach liquor and residue, and the caustic leach metallurgical balance are presented in Tables 2A, 2B and 2C.

A 20 g aliquot of residue from HPC2 test was added to a 180 ml of 20% HCl solution in a glass reactor, equipped with an agitator to target a pulp density of 10% solids by weight. The slurry was leached at ambient temperature for a period of 60 minutes, after which it was filtered in a pressure filter to recover the Sc/REE-bearing primary leach solution (PLS). The acid leach cake was washed thoroughly with water. The volume and mass of the acid leach liquor were determined, the mass of the wet cake, as well and its mass after drying were measured. Samples of the leach liquor and cake were chemically analyzed. A metallurgical balance for the acid leach step (stage 2 of the process), showed 70% of scandium and 89.7% of REE were extracted into the hydrochloric acid leach liquor (see Tables 3A, 3B et 3C). The leach solution was further processed for the recovery of scandium and the rare earth elements.

Testing High Pressure Caustic (HPC) Leaching–5

A bench scale test was conducted in HPC5 with 150 g of MET01 mineral concentrate using the same procedure described above for HPC2 test, but used 200 g of caustic solution to target a pulp density of 43% solids by weight. The caustic lixiviant contained 120 g of 100% NaOH (0.8 ton of NaOH per ton of mineral concentrate). The test was conducted at 180° C., for a period of 120 minutes. The metallurgical balance for the caustic cracking stage showed 26.7% dissolution of silicates, with 1.3% Sc and 0.3% REE deportment to caustic solution.

The residue from the caustic decomposition stage 1 was leached in hydrochloric acid at 10% pulp density, and ambient temperature for 1200 minutes (20 hours). The mass balance indicated that 67% of scandium and 87.3% of the rare earth elements were recovered into the leach solution (see Tables 3A, 3B et 3C).

Testing High Pressure Caustic (HPC) Leaching—7

Another high-pressure caustic leach test was conducted with 100 g of MET01 mineral concentrate, and 230 g of caustic solution, containing 138 g of 100% NaOH, (or 1.38 ton of NaOH per ton of mineral concentrate) to target 30% pulp density. The test was conducted at 220° C., for 120 minutes using similar procedure described above. The metallurgical balance for the caustic dissolution step of the process showed 37.8% decomposition of silicates, 10% Sc, and 1% REE dissolution.

Residue from stage 1 of the process was leached in a 20% HCl solution for 60 minutes at ambient temperature and a pulp density of 10%. Scandium deportment to acid leach liquor was 90.7%, while REE recovery was 93.4% (see Tables 3A, 3B et 3C).

Testing High Pressure Caustic (HPC) Leaching—8

Another bench scale HPC leach, followed by a hydrochloric acid leach of the caustic leach cake with identical conditions to those in HPC7 test was conducted using a MET02 mineral concentrate sample as feed (see Table 1 for the chemical composition of feedstock and Tables 2A, 2B and 2C for the test conditions).

At the caustic leach step, 22.5% Si decomposition was achieved with 12.2% Sc and 1.1% REE dissolution. The metallurgical balance for the hydrochloric acid leach of the caustic cake achieved 83.7% and 83.1% recovery respectively for Sc and REE (see Tables 3A, 3B et 3C).

Testing High Pressure Caustic (HPC) Leaching—9

A bench scale test was conducted on MET01 mineral concentrate at conditions similar to HPC7 except that the caustic addition rate was 1 ton NaOH per ton of mineral concentrate. The caustic leach material balance showed a 36.3% silicates decomposition, 8.3% Sc and 0.9% REE dissolution rates. The HCl leach achieved 88.5% Sc and 90.3% REE recovery to acid leach liquor.

Testing Crude Scandium Cake and REE Carbonate Precipitation

A series of bench scale precipitation tests were conducted on the primary leach solution obtained from HPC7 HCl leach test to precipitate crude scandium cake, iron and mixed REE carbonate at various pH. The ferric iron in the primary leach solution obtained from HPC7 HCl leach test was reduced to the ferrous state with the addition of metallic iron powder to avoid Fe co-precipitation with Sc. The pH of the solution was then adjusted to pH 3.5 with the addition of magnesium oxide (MgO). The precipitated crude Sc cake was recovered following a solid/liquid separation step. To precipitate iron from the Sc-depleted liquor, the iron was re-oxidized from $Fe^{2+}$ to $Fe^{3+}$. The rare earth elements were then precipitated from the Sc and Fe depleted liquor with the addition of sodium carbonate at pH 6. About 96 wt.-% of Sc in the primary leach solution was precipitated as crude Sc cake at pH 3.5 and 97% of Fe in solution was precipitated as an iron precipitate after re-oxidation. 66% of REE in the primary leach solution was recovered into a mixed REE carbonate product.

The chemical composition of mineral concentrates used in the tests is presented in Table 1. The test conditions for the high-pressure caustic leach (stage 1), and the hydrochloric acid leach of the caustic residue (stage 2), and their metallurgical balances are provided in Tables 2 and 3 respectively. The precipitation test results and metallurgical balance are presented in Table 4.

TABLE 1

| | | Feedstock Composition | |
|---|---|---|---|
| Sample Name | Unit | Met 1 Mineral Concentrate | Met 2 Mineral Concentrate |
| $SiO_2$ | [wt.-%] | 44.4 | 41.9 |
| $Al_2O_3$ | [wt.-%] | 7.5 | 6.9 |
| $Fe_2O_3$ | [wt.-%] | 26.9 | 31.4 |
| $TiO_2$ | [wt.-%] | 1.8 | 2.2 |
| $K_2O$ | [wt.-%] | 2.5 | 2.2 |
| $Na_2O$ | [wt.-%] | 2.3 | 2.0 |
| CaO | [wt.-%] | 10.0 | 8.6 |
| MgO | [wt.-%] | 2.5 | 2.6 |
| BaO | [wt.-%] | 0.05 | 0.07 |
| $MnO_2$ | [wt.-%] | 1.02 | 1.19 |
| $P_2O_5$ | [wt.-%] | 1.03 | 1.24 |
| $ZrO_2$ | [wt.-%] | 0.56 | 0.73 |
| Sc | [mg/kg] | 381 | 244 |
| Total rare earth elements | [mg/kg] | 3363 | 2747 |

TABLE 2A

High Pressure Caustic Leach (HPC Stage 1) Test Conditions

Table 2A - High Pressure Caustic Leach Test Conditions

| Parameters | Unit | HPC2 | HPC5 | HPC7 | HPC 8 | HPC 9 |
|---|---|---|---|---|---|---|
| Feed Sample | type | Met1 Mineral Concentrate | Met1 Mineral Concentrate | Met1 Mineral Concentrate | Met2 Mineral Concentrate | Met1 Mineral Concentrate |
| Mass feed | g | 150 | 150 | 100 | 100 | 100 |
| Leaching agent | type | NaOH | NaOH | NaOH | NaOH | NaOH |
| Mass NaOH (100%) | g | 60 | 120 | 138 | 138 | 100 |
| Mass reagent liquor | g | 100 | 200 | 230 | 230 | 230 |

TABLE 2A

| | High Pressure Caustic Leach Test Conditions | | | | | |
|---|---|---|---|---|---|---|
| Parameters | Unit | HPC2 | HPC5 | HPC7 | HPC 8 | HPC 9 |
| Leaching time | min | 120 | 120 | 120 | 120 | 120 |
| Leaching temperature | ° C. | 250 | 180 | 220 | 220 | 220 |
| Slurry solid content | wt.-% | 60 | 43 | 30 | 30 | 30 |
| Type of filter | | vacuum | vacuum | pressure | pressure | pressure |

TABLE 2B

High Pressure Caustic Leach (HPC Stage 1) - Chemical Analysis
Table 2B - High Pressure Caustic Leach Chemical Analysis

| | HPC2 | | HPC5 | | HPC7 | | HPC8 | | HPC9 | |
| | Residue | Solution | Residue | Solution | Residue | Solution | Residue | Solution | Residue | Solution |
| Elem. | [mg/kg] | [mg/l] | [mg/kg] | [mg/l] | [mg/kg] | [mg/l] | [mg/kg] | [mg/l] | [mg/kg] | [mg/l] |
|---|---|---|---|---|---|---|---|---|---|---|
| Na | 81,000 | 14,000 | 122000 | 60000 | 94000 | 18470 | 114000 | 12200 | 91000 | 15000 |
| Mg | 15,000 | <1 | 13000 | <1 | 15000 | 0.4 | 12000 | <0.1 | 15000 | 0.2 |
| Al | 39,000 | 79 | 37000 | 350 | 35000 | 120 | 26000 | 160 | 37000 | 83 |
| Si | 150,000 | 6,800 | 129000 | 11000 | 129000 | 1800 | 120000 | 1000 | 130000 | 2100 |
| P | 4,500 | 26 | 3600 | 170 | 3400 | 27 | 2300 | 68 | 3800 | 19 |
| K | 14,000 | 920 | 7000 | 3500 | 5000 | 510 | 2000 | 450 | 7000 | 540 |
| Ca | 76,000 | 13 | 68000 | <1 | 80000 | 0.2 | 55000 | 1.4 | 79000 | 0.7 |
| Fe | 190,000 | 12 | 180000 | 9.4 | 200000 | 4.2 | 220000 | 0.6 | 200000 | 2 |
| Zr | 4100 | <1 | 2400 | <1 | 3300 | 0.1 | 5500 | <0.1 | 3300 | 0.1 |
| Sc | 355 | <1 | 330 | <1 | 390 | <1 | 251 | <0.1 | 390 | <1 |
| ΣREE | 3937 | <1 | 3643.8 | 1141.5 | 4281.5 | <1 | 3231 | <0.1 | 3955 | <1 |

TABLE 2C

High Pressure Caustic Leach (HPC Stage 1) - Metallurgical Balance
Table 2C - High Pressure Leach Metallurgical Balance

| | HPC2 | | HPC5 | | HPC7 | | HPC8 | | HPC9 | |
| | Rmng in residue | Ext to solution | Rmng in residue | Ext to solution | Rmng in residue | Ext to solution | Rmng in residue | Ext to solution | Rmng in residue | Ext to solution |
| Elem. | [wt.-%] | [wt.-%] | [wt.-%] | [wt.-%] | [wt.-%] | [wt.-%] | [wt.-%] | [wt.-%] | [wt.-%] | [wt.-] |
|---|---|---|---|---|---|---|---|---|---|---|
| Na | 36.5 | 63.5 | 31.3 | 68.7 | 10.5 | 89.5 | 21.1 | 78.9 | 14.7 | 85.3 |
| Mg | 99.9 | 0.1 | 100.0 | 0.0 | 99.7 | 0.3 | 99.7 | 0.3 | 99.8 | 0.2 |
| Al | 98.0 | 2.0 | 95.9 | 4.1 | 87.0 | 13.0 | 82.3 | 17.7 | 92.7 | 7.3 |
| Si | 68.6 | 31.4 | 72.4 | 27.6 | 62.2 | 37.8 | 77.5 | 22.5 | 63.7 | 36.3 |
| P | 94.5 | 5.5 | 82.6 | 17.4 | 74.3 | 25.7 | 49.2 | 50.8 | 85 | 15 |
| K | 60.2 | 39.8 | 30.9 | 69.1 | 18.4 | 81.6 | 11.3 | 88.7 | 26.9 | 73.1 |
| Ca | 99.8 | 0.2 | 100.0 | 0.0 | 99.9 | 0.1 | 99.9 | 0.1 | 100 | 0 |
| Fe | 99.9 | 0.1 | 100.0 | 0.0 | 99.9 | 0.1 | 100.0 | 0.0 | 100 | 0 |
| Zr | 99.8 | 0.2 | 99.8 | 0.2 | 99.9 | 0.1 | 99.9 | 0.1 | 99.9 | 0.1 |
| Sc | 97.2 | 2.8 | 98.7 | 1.3 | 90.0 | 10.0 | 87.8 | 12.2 | 91.7 | 8.3 |
| ΣREE | 99.7 | 0.3 | 99.9 | 0.1 | 99.0 | 1.0 | 98.9 | 1.1 | 99.1 | 0.9 |

TABLE 3A

Hydrochloric Acid Leach (HPC Stage 2) - Test Conditions
Table 3A - Hydrochloric Acid Leach Test Conditions

| Parameters | Unit | HPC2 HCl | HPC5 HCl | HPC7 HCl | HPC8 HCl | HPC9 HCl |
|---|---|---|---|---|---|---|
| Feed Sample | type | Residue from HPC2 | Residue from HPC5 | Residue from HPC7 | Residue from HPC8 | Residue from HPC9 |
| Mass feed | g | 20 | 20 | 20 | 20 | 20 |
| Reagent | | HCl (20%) | HCl (20%) | HCl (20%) | HCl (20%) | HCl (20%) |
| Volume reagent | ml | 180 | 180 | 180 | 180 | 180 |
| Leaching time | min | 60 | 1200 | 60 | 60 | 60 |
| Leaching temperature | °C. | ambient | ambient | ambient | ambient | ambient |
| Volume for leach | ml | 180 | 180 | 180 | 180 | 180 |
| Solid content | wt.-% | 10 | 10 | 10 | 10 | 10 |
| Type of filter | | pressure | pressure | pressure | pressure | pressure |

TABLE 3A-continued

Hydrochloric Acid Leach (HPC Stage 2) - Test Conditions
Table 3A - Hydrochloric Acid Leach Test Conditions

TABLE 3E

Hydrochloric Acid Leach (HPC Stage 2) - Chemical Analysis
Table 3B - Hydrochloric Acid Leach Chemical Analysis

| | HPC2-HCl | | HPC5-HCl | | HPC7-HCl | | HPC8-HCl | | HPC9-HCl | |
| | Residue | Solution | Residue | Solution | Residue | Solution | Residue | Solution | Residue | Solution |
| Elem. | [mg/kg] | [mg/l] | [mg/kg] | [mg/l] | [mg/kg] | [mg/l] | [mg/kg] | [mg/l] | [mg/kg] | [mg/l] |
|---|---|---|---|---|---|---|---|---|---|---|
| Na | 4,000 | 2,600 | 10000 | 3300 | 9600 | 4200 | 18100 | 5000 | 11000 | 4300 |
| Mg | 8,000 | 410 | 9000 | 340 | 4100 | 870 | 4600 | 510 | 5000 | 630 |

TABLE 3E-continued

Hydrochloric Acid Leach (HPC Stage 2) - Chemical Analysis
Table 3B - Hydrochloric Acid Leach Chemical Analysis

| | HPC2-HCl | | HPC5-HCl | | HPC7-HCl | | HPC8-HCl | | HPC9-HCl | |
|---|---|---|---|---|---|---|---|---|---|---|
| Elem. | Residue [mg/kg] | Solution [mg/l] | Residue [mg/kg] | Solution [mg/l] | Residue [mg/kg] | Solution [mg/l] | Residue [mg/kg] | Solution [mg/l] | Residue [mg/kg] | Solution [mg/l] |
| Al | 12,000 | 1,200 | 14000 | 970 | 12000 | 1700 | 10000 | 1000 | 17000 | 1400 |
| Si | 322,000 | 280 | 294000 | 140 | 310000 | 490 | 220000 | 240 | 285000 | 83 |
| P | 2,000 | 120 | 1100 | 97 | 2400 | 150 | 2000 | 80 | 3100 | 120 |
| K | 4,000 | 370 | 5000 | 240 | 5800 | 300 | 3600 | 80 | 6000 | 260 |
| Ca | 38,000 | 1,900 | 43000 | 1600 | 16000 | 4300 | 19000 | 2400 | 35000 | 29000 |
| Fe | 80,000 | 6,300 | 90000 | 4700 | 60000 | 12000 | 120000 | 11500 | 60000 | 9000 |
| Zr | 10100 | 4 | 8000 | <1 | 9500 | 3.8 | 12100 | 1.9 | 8700 | 3.5 |
| Sc | 298 | 10 | 280 | 7.8 | 125 | 21 | 50 | 9.4 | 100 | 16 |
| ΣREE | 931 | 116 | 1100 | 103.3 | 784.1 | 192.5 | 775.6 | 139.4 | 760 | 148 |

TABLE 3C

Hydrochloric Acid Leach (HPC Stage 2) - Metallurgical Balance
Table 3C - Hydrochloric Acid Leach Metallurgical Balance

| | HPC2-HCl | | HPC5-HCl | | HPC7-HCl | | HPC8-HCl | | HPC9-HCl | |
|---|---|---|---|---|---|---|---|---|---|---|
| Elem. | Rmng. in residue [wt.-%] | Ext to solution [wt.-%] | Rmng. in residue [wt.-%] | Ext to solution [wt.-%] | Rmng. in residue [wt.-%] | Ext to solution [wt.-%] | Rmng. in residue [wt.-%] | Ext to solution [wt.-%] | Rmng. in residue [wt.-%] | Ext to solution [wt.-%] |
| Na | 2.2 | 97.8 | 4.0 | 96.0 | 3.8 | 96.2 | 11.7 | 88.3 | 5.1 | 94.9 |
| Mg | 21.9 | 78.1 | 26.6 | 73.4 | 98.6 | 1.4 | 99.4 | 0.6 | 99.1 | 0.9 |
| Al | 12.6 | 87.4 | 16.5 | 83.5 | 10.9 | 89.1 | 26.8 | 73.2 | 20.2 | 79.8 |
| Si | 94.3 | 5.7 | 96.6 | 3.4 | 91.6 | 8.4 | 97.1 | 2.9 | 98.6 | 1.4 |
| P | 19.3 | 80.7 | 13.4 | 86.6 | 21.7 | 78.3 | 47.7 | 52.3 | 35.0 | 65.0 |
| K | 13.5 | 86.5 | 22.2 | 77.8 | 25.1 | 74.9 | 62.2 | 37.8 | 32.5 | 67.5 |
| Ca | 22.3 | 77.7 | 26.9 | 73.1 | 99.6 | 0.4 | 99.9 | 0.1 | 99.9 | 0.1 |
| Fe | 15.4 | 84.6 | 20.8 | 79.2 | 8.0 | 92.0 | 27.6 | 72.4 | 12.2 | 87.8 |
| Zr | 97.6 | 2.4 | 99.1 | 0.9 | 97.7 | 2.3 | 99.6 | 0.4 | 98.1 | 1.9 |
| Sc | 30.0 | 70.0 | 33.0 | 67.0 | 9.3 | 90.7 | 16.3 | 83.7 | 11.5 | 88.5 |
| ΣREE | 10.3 | 89.7 | 12.7 | 87.3 | 6.6 | 93.4 | 16.9 | 83.1 | 9.7 | 90.3 |

TABLE A

Crude Scandium Cake and REE Carbonate Precipitation

Crude Sc Cake and REE Carbonate Precipitation

| | Grade | | | | Recovery | | | |
|---|---|---|---|---|---|---|---|---|
| Elements | Crude Sc Cake [mg/kg] | Fe Precipitate [mg/kg] | REE Carbonate [mg/kg] | Barren Solution [mg/l] | Crude Sc Cake [wt.-%] | Iron Precipitate [wt.-%] | REE Carbonate [wt.-%] | Barren Solution [wt.-%] |
| Na | 2900 | 13000 | 12000 | 5850 | 1.3 | 15.7 | 1.2 | 81.8 |
| Mg | 59000 | 64000 | 98000 | 48300 | 3.4 | 9.8 | 1.2 | 85.6 |
| Al | 75000 | 2200 | 2200 | 0.3 | 92.1 | 7.3 | 0.6 | 0 |
| Si | 1400 | 30 | 22 | 0.4 | 93.5 | 5.4 | 0.3 | 0.8 |
| P | 3600 | 20 | <1 | <0.1 | 98.4 | 1.5 | 0 | 0.1 |
| K | 280 | 770 | 550 | 350 | 0.9 | 2.4 | 1 | 95.7 |
| Ca | 2300 | 5600 | 20000 | 4000 | 1.8 | 0.2 | 3.3 | 94.7 |
| Fe | 16000 | 289000 | 42000 | 0.6 | 2 | 96.9 | 1.1 | 0 |
| Zr | 200 | 7.5 | 1.6 | <0.1 | 79.5 | 8 | 0.1 | 12.3 |
| Sc | 1000 | 3.7 | 6.5 | <0.1 | 95.9 | 1 | 0.1 | 3 |
| ΣREE | 1226 | 365 | 20983 | 3.1 | 17.9 | 14.3 | 66.4 | 1.4 |

Mineral concentrates prepared from MET02 sample was used for HPC tests PC1, PC2 and PC3. The chemical composition of the mineral concentrates is presented in Table 5. The test conditions for the high-pressure caustic leach (stage 1), and the mineral acid leach of the caustic residue (stage 2), and their metallurgical balances are provided in tables 6 and 7, respectively.

Testing High Pressure Caustic (HPC) Leaching—PC1-AL1

A MET02 PP1+PP2 scandium/REE mineral concentrate weighing 500 g (grade provided below in Table 5), was added to a 2 L autoclave together with 690 g of 100% sodium hydroxide dissolved in water at caustic addition rate of 1.38 tons NaOH per ton of mineral concentrate and a target a pulp density at 30% solids by weight. The slurry consisting of mineral concentrate and NaOH solution was agitated in an autoclave while being heated to a target temperature of 250° C. The slurry was kept at the target temperature for a period of 120 minutes to allow the dissolution of silicate minerals. After 120 minutes, the slurry was cooled to about 80° C., and then filtered in a vacuum filter to separate the caustic leach solution from the Sc/REE containing-residue. The residue was thoroughly washed with water. The mass and volume of the leach liquor (including wash solution) were determined to be 4409.0 g, and 3758.7 ml respectively. The mass of the wet residue was measured to be 598.9 g, and its mass after drying was 389.7 g. Aliquots of the leach liquor and dry residue were taken for chemical analysis. The metallurgical balance of the caustic dissolution (stage 1) for this test showed that 58.2% of Si and 37.9% of Al were dissolved while only 4.4% Sc and 4.9% of neodymium (Nd) (a proxy element used for the REE) deported to the caustic leach liquor. The test conditions, chemical analysis of the leach liquor and residue, and the caustic leach metallurgical balance are presented in Tables 6A, 6B and 6C.

A 300 g sample of residue from PC1 test was added to a 2477 ml of 20% HCl solution in a glass reactor, equipped with an agitator to target a pulp density of 10% solids by weight. The slurry was leached at ambient temperature for a period of 60 minutes, after which it was filtered in a pressure filter to recover the Sc/REE-bearing primary leach solution (PLS). The acid leach cake was washed thoroughly with water. The volume and mass of the acid leach liquor were determined, the mass of the wet cake, as well and its mass after drying were measured. Samples of the leach liquor and cake were chemically analyzed. A metallurgical balance for the acid leach step (stage 2 of the process), showed 93.2% of scandium and 91.2% of REE were extracted into the hydrochloric acid leach liquor (see Tables 7A, 7B et 7C).

Testing High Pressure Caustic (HPC) Leaching—PC2-AL2

A bench scale test was conducted in PC2 with 500 g of MET02 PP1+PP2 mineral concentrate using the same procedure described above for PC1 test, but at leaching temperature of 220° C., for a period of 120 minutes. The metallurgical balance for the caustic cracking stage showed 46.6% dissolution of silicates with 34.7% Al, 0.9% Sc and 2.3% Nd deport to caustic solution.

A 300 g sample of the residue from the caustic decomposition stage 1 in test PC2 was leached in 2477 ml of 20% hydrochloric acid solution at 10% pulp density, and ambient temperature for 60 minutes (AL2). The mass balance showed that 84.6% of scandium and 88.6% of the rare earth elements were recovered into the leach solution (see Tables 7A, 7B et 7C).

Testing High Pressure Caustic (HPC) Leaching—PC3-AL3.1/AL3.2

Another high-pressure caustic leach test was conducted with 6.0 Kg of MET02 PP3+PP4 mineral concentrate, and 14 Kg of caustic solution, containing 8.28 Kg of 100% NaOH, (or 1.38 ton of NaOH per ton of mineral concentrate) to target 30% pulp density in a 20 L autoclave. The test was conducted at 250° C., for 120 minutes using similar procedure described above. The metallurgical balance for the caustic dissolution step of the process showed zero percent scandium dissolution, 57.8% decomposition of silicates, 27.6% Al and 6.9% Nd dissolution.

A 300 g of residue from stage 1 of the process (PC3 tests) was leached in a 20% HCl solution for 60 minutes at ambient temperature and a pulp density of 10% (AL3.1 test). Scandium deportment to acid leach liquor was 96.3%, while REE recovery was 95.3% (see Tables 7A, 7B et 7C).

5 Another 300 g of residue from PC3 test was leached in a 20 g/L HCl solution for 60 minutes at ambient temperature and a pulp density of 10% (AL3.2 test). The scandium recovery to the PLS was 62.3%, and REE extraction was 95.8% (see Tables 7A, 7B et 7C).

TABLE 5

Composition of MET02 Mineral Concentrate

| Sample Name | Unit | MET02 PP1 + PP2 | MET02 PP3 + PP4 |
|---|---|---|---|
| $SiO_2$ | [wt-%] | 42.5 | 42.7 |
| $Al_2O_3$ | [wt-%] | 6.99 | 7.04 |
| $Fe_2O_3$ | [wt-%] | 28.9 | 29.0 |
| MgO | [wt-%] | 2.61 | 2.64 |
| CaO | [wt-%] | 8.29 | 8.35 |
| $Na_2O$ | [wt-%] | 2.33 | 2.33 |
| $K_2O$ | [wt-%] | 2.25 | 2.25 |
| $TiO_2$ | [wt-%] | 1.9 | 1.92 |
| $P_2O_5$ | [wt-%] | 1.33 | 1.33 |
| MnO | [wt-%] | 0.94 | 0.94 |
| Sc | [wt-%] | 0.03 | 0.03 |
| Nd | [wt-%] | 0.06 | 0.07 |

TABLE 6A

High Pressure Caustic Leach Test Conditions for MET02 Concentrate

| Parameters | Unit | PC1 | PC2 | PC3 |
|---|---|---|---|---|
| Feed Sample | type | Met2 PP1 + PP2 Mineral Concentrate | Met2 PP1 + PP2 Mineral Concentrate | Met2 PP3 + PP4 Mineral Concentrate |
| Mass feed | g | 500 | 500 | 500 |
| Leaching agent | type | NaOH | NaOH | NaOH |
| Mass NaOH (100%) | g | 690 | 690 | 690 |
| Mass reagent liquor | g | 1167 | 1167 | 1167 |
| Leaching time | min | 120 | 120 | 120 |
| Leaching temperature | ° C. | 250 | 220 | 250 |
| Slurry solid content | wt.-% | 30 | 30 | 30 |
| Type of filter | | vacuum | vacuum | vacuum |

TABLE 6B

High Pressure Caustic Leach - Chemical Analysis

| Element | PC1 Residue mg/kg | PC1 Solution mg/L | PC2 Residue mg/kg | PC2 Solution mg/L | PC3 Residue mg/kg | PC3 Solution mg/L |
|---|---|---|---|---|---|---|
| Na | 91,248 | N/A | 76,411 | N/A | 94,958 | 432000 |
| Mg | 18,815 | N/A | 18,272 | N/A | 19,719 | 49.6 |
| Al | 29,479 | 6720 | 28,844 | 5160 | 35,195 | 8280 |
| Si | 106,575 | 7000 | 126,675 | 10160 | 109,847 | 5140 |
| P | 3,884 | 534 | 3,404 | 354 | 4,626 | 740 |
| K | 747 | N/A | 2,823 | N/A | 1,245 | 23000 |
| Ca | 69,682 | N/A | 67,109 | N/A | 82,189 | <18 |
| Fe | 245,498 | N/A | 228,013 | N/A | 212,625 | 266 |
| Ti | 12,946 | N/A | 12,826 | N/A | 15,583 | <0.4 |
| Sc | 368 | N/A | 355 | N/A | 439 | <0.2 |
| ΣREE | 4017 | N/A | 3964 | N/A | 4581 | <1.0 |

N/A—Assay not available

TABLE 6C

High Pressure Caustic Leach - Metallurgical Balance

| Element | PC1 Rmng in residue wt-% | PC1 Ext to solution wt-% | PC2 Rmng in residue wt-% | PC2 Ext to solution wt-% | PC3 Rmng in residue wt-% | PC3 Ext to solution wt-% |
|---|---|---|---|---|---|---|
| Mg | 93 | 7 | 97 | 3 | 95 | 5 |
| Al | 62 | 38 | 65 | 35 | 72 | 28 |
| Si | 42 | 58 | 53 | 47 | 42 | 58 |
| P | 52 | 48 | 49 | 51 | 61 | 39 |
| K | 3 | 97 | 13 | 87 | 5 | 95 |
| Ca | 92 | 8 | 95 | 5 | 100 | 0 |
| Fe | 95 | 5 | 94 | 6 | 80 | 20 |
| Ti | 89 | 11 | 94 | 6 | 100 | 0 |
| Sc | 96 | 4 | 99 | 1 | 100 | 0 |
| Nd | 95 | 5 | 98 | 2 | 93 | 7 |

TABLE 7A

Hydrochloric Acid Leach (HPC Stage 2) - Test Conditions

| Parameters | Unit | PC1 AL1 | PC2 AL2 | PC3 AL3.1 | PC3 AL3.2 |
|---|---|---|---|---|---|
| Feed Sample | type | Residue from PC1 | Residue from PC2 | Residue from PC3 | Reside from PC3 |
| Mass feed | g | 300 | 300 | 300 | 300 |
| Reagent | | HCl (20%) | HCl (20%) | HCl (20%) | HCl (20 g/L) |
| Volume reagent | ml | 2477 | 2477 | 2477 | 2477 |
| Leaching time | min | 60 | 60 | 60 | 60 |
| Leaching temperature | ° C. | ambient | ambient | ambient | ambient |
| Solid content | wt.-% | 10 | 10 | 10 | 10 |
| Type of filter | | vacuum | vacuum | vacuum | vacuum |

TABLE 7B

Hydrochloric Acid Leach - Chemical Analysis

| Element | PC1-ALI Residue mg/kg | PC1-ALI Solution mg/l | PC2 AL2 Residue mg/kg | PC2 AL2 Solution mg/l | PC3 AL3.1 Residue mg/kg | PC3 AL3.1 Solution mg/l | PC3 AL3.2 Residue mg/kg | PC3 AL3.2 Solution mg/l |
|---|---|---|---|---|---|---|---|---|
| Na | 8,606 | 11,500 | 4,525 | 9,020 | 3,783 | 12,700 | 1,929 | 16,800 |
| Mg | 2,472 | 2,510 | 6,754 | 1,880 | 1,146 | 2,690 | 2,111 | 3,430 |
| Al | 11,008 | 4,010 | 9,685 | 3,100 | 2,646 | 5,000 | 1,641 | 6,380 |
| Si | 293,082 | N/A | 313,649 | N/A | 353,848 | N/A | 185,104 | N/A |
| P | 3,971 | 347 | 1,484 | 364 | 5,761 | 341 | 4,844 | 348 |
| K | 996 | 50 | 4,815 | 101 | 1,162 | 97 | 996 | 107 |
| Ca | 7,719 | 9,480 | 17,367 | 7,260 | 2,859 | 10,200 | 1,501 | 14,500 |
| Fe | 33,153 | 31,100 | 69,243 | 24,400 | 16,996 | 24,700 | 259,487 | 10,700 |
| Ti | 17,561 | 823 | 18,999 | 534 | 19,059 | 981 | 25,472 | 148 |
| Sc | 71 | 47 | 137 | 38 | 54 | 53 | 388 | 37 |
| ΣREE | 803 | 520 | 650 | 425 | 377 | 529 | 284 | 751 |

TABLE 7C

| | Hydrochloric Acid Leach - Metallurgical Balance | | | | | | | |
| | PC1-AL1 | | PC2 AL2 | | PC3 AL3.1 | | PC3 AL3.2 | |
| Element | Rmng in residue wt-% | Ext to solution wt-% | Rmng in residue wt-% | Ext to solution wt-% | Rmng in residue wt-% | Ext to solution wt-% | Rmng in residue wt-% | Ext to solution wt-% |
|---|---|---|---|---|---|---|---|---|
| Na | 3.3 | 96.7 | 2.4 | 97.6 | 1.2 | 98.8 | 0.9 | 99.1 |
| Mg | 4.6 | 95.4 | 14.8 | 85.2 | 1.8 | 98.2 | 4.6 | 95.4 |
| Al | 13.1 | 86.9 | 13.4 | 86.6 | 2.3 | 97.7 | 2.0 | 98.0 |
| Si | 96.7 | 3.3 | 98.9 | 1.1 | 97.2 | 2.8 | 71.8 | 28.2 |
| P | 36.0 | 64.0 | 17.4 | 82.6 | 37.6 | 62.4 | 44.6 | 55.4 |
| K | 46.9 | 53.1 | 68.1 | 31.9 | 28.2 | 71.8 | 34.1 | 65.9 |
| Ca | 3.9 | 96.1 | 10.3 | 89.7 | 1.0 | 99.0 | 0.8 | 99.2 |
| Fe | 4.7 | 95.3 | 12.1 | 87.9 | 2.4 | 97.6 | 52.0 | 48.0 |
| Ti | 47.7 | 52.3 | 59.2 | 40.8 | 36.9 | 63.1 | 69.7 | 30.3 |
| Sc | 6.8 | 93.2 | 15.4 | 84.6 | 3.7 | 96.3 | 37.7 | 62.3 |
| ΣREE | 8.8 | 91.2 | 11.4 | 88.6 | 4.7 | 95.3 | 4.2 | 95.8 |

The above description of the embodiments should not be interpreted in a limiting manner since other variations, modifications and refinements are possible within the scope of the present invention. Accordingly, it should be understood that various features and aspects of the disclosed embodiments can be combined with or substituted for one another in order to form varying modes of the disclosed invention. The scope of the invention is defined in the appended claims and their equivalents.

The invention claimed is:

1. A method of extracting Rare Earth Elements (REE) and/or scandium from ore, REE and/or scandium bearing feedstock, and/or scandium/REE bearing mineral concentrate, the method comprising:

providing the ore, the REE and/or scandium bearing feedstock, and/or scandium/REE bearing mineral concentrate;

leaching the ore, the REE and/or scandium bearing feedstock, and/or the scandium/REE bearing mineral concentrate in an alkali solution at a first temperature for a target duration and at a given pressure to produce a leachate slurry, wherein the leaching in the alkali solution is a High Pressure Caustic (HPC) leaching;

separating a solid residue from the leachate slurry;

leaching of the solid residue in a mineral acid to form a primary leach solution; and extracting REE and/or scandium from the primary leach solution, wherein the given pressure is between 9.87 ATM and 39.48 ATM, the HPC leaching is performed in a reaction vessel or in an autoclave, and the leaching of the solid residue in a mineral acid comprises stirring for a period of 60 to 1200 minutes at a second temperature between 20° C. and 30° C. and at 1 ATM.

2. The method of claim 1, wherein the alkali solution comprises an alkali reagent selected from the group consisting of sodium hydroxide, sodium carbonate, potassium hydroxide, and potassium carbonate.

3. The method of claim 1, wherein the alkali solution is provided at a dosage of 500 g per kg to 2000 g per kg of the ore, the REE and/or scandium bearing feedstock, and/or scandium/REE bearing mineral concentrate.

4. The method of claim 1, wherein, between leaching the ore, the REE and/or scandium bearing feedstock, and/or scandium/REE bearing mineral concentrate in an alkali solution and separating the solid residue from the leachate slurry, the method comprises regenerating and recycling the alkali solution.

5. The method of claim 1, wherein, between leaching the ore, the REE and/or scandium bearing feedstock, and/or scandium/REE bearing mineral concentrate in an alkali solution and separating the solid residue from the leachate slurry, the leachate slurry is cooled down to a second temperature of about 80° C. to ambient temperature.

6. The method of claim 1, wherein, between leaching the ore, the REE and/or scandium bearing feedstock, and/or scandium/REE bearing mineral concentrate in an alkali solution and separating the solid residue from the leachate slurry, the solid residue is washed with water.

7. The method of claim 1, wherein leaching the REE and/or scandium bearing feedstock comprises a slurry solid content of 10 to 45 wt %.

8. The method of claim 1, wherein the first temperature is between 180° C. and 280° C.

9. The method of claim 1, wherein the target duration of the HPC leaching is between 60 minutes and 180 minutes.

10. The method of claim 1, wherein separating the solid residue from the leachate slurry is conducted in a vacuum or pressure filter.

11. The method of claim 1, wherein, between separating the solid residue and leaching of the solid residue in the mineral acid, the method comprises destroying a silicate matrix of REE and/or scandium bearing silicate minerals by forming water soluble sodium silicate thereby liberating Scandium and/or REE.

12. The method of claim 1, wherein, between separating of the solid residue and leaching of the solid residue in the mineral acid, the method comprises transforming fluorides and phosphates to water soluble compounds and removing the water soluble compounds from the leachate slurry.

13. The method of claim 12, wherein fluorides and fluoride containing minerals are removed prior to transforming into water soluble compounds.

14. The method of claim 1, wherein the mineral acid is selected from the group consisting of Hydrochloric acid (HCl), Sulphuric acid ($H_2SO_4$), Nitric acid ($HNO_3$), Hydrobromic acid (HBr), Perchloric acid ($HClO_4$), Hydroiodic acid (HI), and suitable mixtures thereof having a concentration between 5 to 20 wt %.

15. The method of claim 1, wherein the REE the scandium is extracted from the primary leach solution by precipitation, solvent extraction, ion exchange extraction or a combination thereof.

16. The method of claim 1, wherein, between the leaching of the solid residue and extracting REE and/or scandium from the primary leach solution, the method comprises regenerating and recycling the mineral acid.

17. The method of claim 1, wherein Rare-Earth Oxides (REO) are extracted from the primary leach solution by forming a mixed REE-carbonate in the presence of sodium carbonate ($Na_2CO_3$).

\* \* \* \* \*